US012747754B2

(12) United States Patent
Wei et al.

(10) Patent No.: US 12,747,754 B2
(45) Date of Patent: Sep. 29, 2026

(54) BUSHING FOR CLAW MACHINE CRANE

(71) Applicant: PAOKAI ELECTRONIC ENTERPRISE CO., LTD., Kaohsiung City (TW)

(72) Inventors: Ming-Shan Wei, Kaohsiung City (TW); Tung-Ying Wei, Kaohsiung City (TW)

(73) Assignee: PAOKAI ELECTRONIC ENTERPRISE CO., LTD., Kaohsiung City (TW)

( * ) Notice: Subject to any disclaimer, the term of this patent is extended or adjusted under 35 U.S.C. 154(b) by 0 days.

(21) Appl. No.: 19/029,237

(22) Filed: Jan. 17, 2025

(65) Prior Publication Data

US 2026/0146647 A1 May 28, 2026

(30) Foreign Application Priority Data

Nov. 28, 2024 (TW) ................................ 113213046

(51) Int. Cl.

| | |
|---|---|
| ***F16C 33/20*** | (2006.01) |
| ***F16C 17/02*** | (2006.01) |
| ***F16C 33/12*** | (2006.01) |
| *A63F 9/30* | (2006.01) |
| *G07F 17/32* | (2006.01) |

(52) U.S. Cl.
CPC ............ *F16C 33/203* (2013.01); *F16C 17/02* (2013.01); *F16C 33/122* (2013.01); *A63F 9/30* (2013.01); *G07F 17/3216* (2013.01); *G07F 17/3297* (2013.01)

(58) Field of Classification Search
CPC ...... F16C 17/02; F16C 33/122; F16C 33/125; F16C 33/20; F16C 33/203; F16C 33/205
See application file for complete search history.

(56) References Cited

U.S. PATENT DOCUMENTS

| | | | | | |
|---|---|---|---|---|---|
| 1,331,961 | A | * | 2/1920 | Klocke ................... | F16C 33/14<br>29/898.059 |
| 1,460,515 | A | * | 7/1923 | Selker ..................... | F16C 33/24<br>164/DIG. 2 |
| 3,762,881 | A | * | 10/1973 | Dunn ...................... | F16C 33/62<br>29/445 |
| 4,932,097 | A | * | 6/1990 | Kobayashi .............. | B60S 1/345<br>15/250.34 |
| 4,939,827 | A | * | 7/1990 | Iizuka ..................... | F16C 33/08<br>29/515 |

(Continued)

*Primary Examiner* — James Pilkington
(74) *Attorney, Agent, or Firm* — MUNCY, GEISSLER, OLDS & LOWE, P.C.

(57) ABSTRACT

A bushing includes an inner sleeve and a bushing body. The inner sleeve defines an axis, and includes a sleeve tube portion having opposite first and second ends, and a plurality of insertion ribs projecting radially outward from an outer peripheral surface of the sleeve tube portion. The sleeve tube portion has an outer diameter gradually increasing from the first to second ends thereof, and an inner diameter equal along a length thereof. Each insertion rib has a thickness in a radial direction gradually decreasing from the first to second ends of the sleeve tube portion. A sum of a thickness of the sleeve tube portion in the radial direction and the thickness of a corresponding insertion rib is equal in an axial direction of the axis. The bushing body includes a bushing body tube portion defining an insertion hole for insertion of the inner sleeve thereinto.

4 Claims, 7 Drawing Sheets

(56) References Cited

U.S. PATENT DOCUMENTS

| | | | | |
|---|---|---|---|---|
| 5,319,851 | A * | 6/1994 | Ikezawa | F16C 33/08 15/250.31 |
| 2011/0220762 | A1 * | 9/2011 | Gyuricsko | F16C 17/02 244/99.3 |

* cited by examiner

BUSHING FOR CLAW MACHINE CRANE

CROSS-REFERENCE TO RELATED APPLICATION

This application claims priority to Taiwanese Utility Model Patent Application No. 113213046, filed on Nov. 28, 2024, and incorporated by reference herein in its entirety.

FIELD

The present disclosure relates to a bushing, and more particularly to a bushing that is a two-piece setup and that is used on a transmission shaft of a claw machine crane.

BACKGROUND

Generally, a claw machine uses a crane to drive clamping jaws to move, so that the clamping jaws can translate in a horizontal direction and rise and fall in a height direction (for example, Taiwanese Utility Model Patent No. TWM644323).

Referring to FIGS. 1 and 2, a conventional claw machine crane is disposed on two guide rods (not shown) extending in a horizontal direction in the claw machine. The claw machine crane includes a base plate 11, two spaced-apart bushings 12, two transmission shafts 13, 13' inserted rotatably and respectively into the bushings 12, four wheel bodies 14 respectively disposed in pairs on the transmission shafts 13, 13', two transmission gears 15 respectively disposed on the transmission shafts 13, 13' and each adjacent to one of the wheel bodies 14, a wire feeding wheel 16 disposed on one of the transmission shafts 13 for connection with a gripping jaw device (not shown), and two power sources 17 (only one is shown in FIG. 1) disposed on the base plate 11 and operable to drive the transmission gears 15, respectively.

The two wheel bodies 14 disposed on each transmission shaft 13, 13' are respectively located at two opposite sides of the base plate 11, and are respectively disposed on and in rollable contact with the guide rods. The transmission shaft 13', which is not provided with the wire feeding wheel 16, is fixedly connected to the two wheel bodies 14 disposed thereon for synchronous rotation therewith. The transmission shaft 13, which is provided with the wire feeding wheel 16, is pivoted and rotatable relative to the wheel bodies 14 disposed thereon, and is fixedly connected to the wire feeding wheel 16 for synchronous rotation therewith. One of the power sources 17 can drive the transmission shaft 13 and the wire feeding wheel 16 to rotate by driving a respective one of the transmission gears 15, so that, by rotating the wire feeding wheel 16 in two directions for winding and unwinding a wire (not shown), the gripping jaw device can be moved up and down in the claw machine. The other power source 17 can drive the transmission shaft 13' and the two wheel bodies 14 disposed thereon to rotate by driving the other respective transmission gear 15 so that the wheel bodies 14 can move on the guide rods. At this time, the two wheel bodies 14 on the transmission shaft 13 will rotate relative to the transmission shaft 13 and will be driven by the wheel bodies 14 on the transmission shaft 13' to move on the guide rods.

FIG. 2 illustrates one of the bushings 12. Generally speaking, the bushing 12 may be made of one piece of metal or plastic, and includes a bushing body tube portion 121 extending into the base plate 11 and sleeved on one of the transmission shafts 13, 13', and an annular flange 122 projecting radially outward from an outer peripheral surface of the bushing body tube portion 121. As shown in FIG. 1, the annular flange 122 of each bushing 12 is limited between the base plate 11 and a positioning seat 18 fixed to the base plate 11. In order to allow the transmission shafts 13, 13' to rotate relative to each other, lubricating oil is applied to an inner surface of the bushing body tube portion 121 of each bushing 12 that contacts the respective transmission shaft 13, 13'. When each bushing 12 is made of metal, the lubricating oil does not easily adhere to the inner surface of the bushing body tube portion 121, so it is necessary to replenish the lubricating oil from time to time; and when each bushing 12 is made of plastic, it has the disadvantage of insufficient rigidity.

SUMMARY

Therefore, an object of the present disclosure is to provide a bushing for a claw machine crane that can alleviate at least one of the drawbacks of the prior art.

According to this disclosure, the bushing for a claw machine crane includes an inner sleeve and a bushing body. The inner sleeve is made of plastic, and defines an axis. The inner sleeve includes a sleeve tube portion defining a through hole that extends therethrough in an axial direction of the axis, and a plurality of equiangularly spaced-apart insertion ribs projecting radially outward from an outer peripheral surface of the sleeve tube portion. The sleeve tube portion has an outer diameter gradually increasing from a first end to a second end of the sleeve tube portion that is opposite to the first end in the axial direction, and an inner diameter equal along a length thereof. Each insertion rib has a thickness in a radial direction gradually decreasing from the first to second ends of the sleeve tube portion. A sum of a thickness of the sleeve tube portion in the radial direction and the thickness of a corresponding one of the insertion ribs is equal in the axial direction.

The bushing body includes a bushing body tube portion extending in the axial direction and defining an insertion hole extending therethrough in the axial direction for insertion of the inner sleeve thereinto, and an annular flange projecting radially outward from an outer peripheral surface of the bushing body tube portion in proximity to one end thereof.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
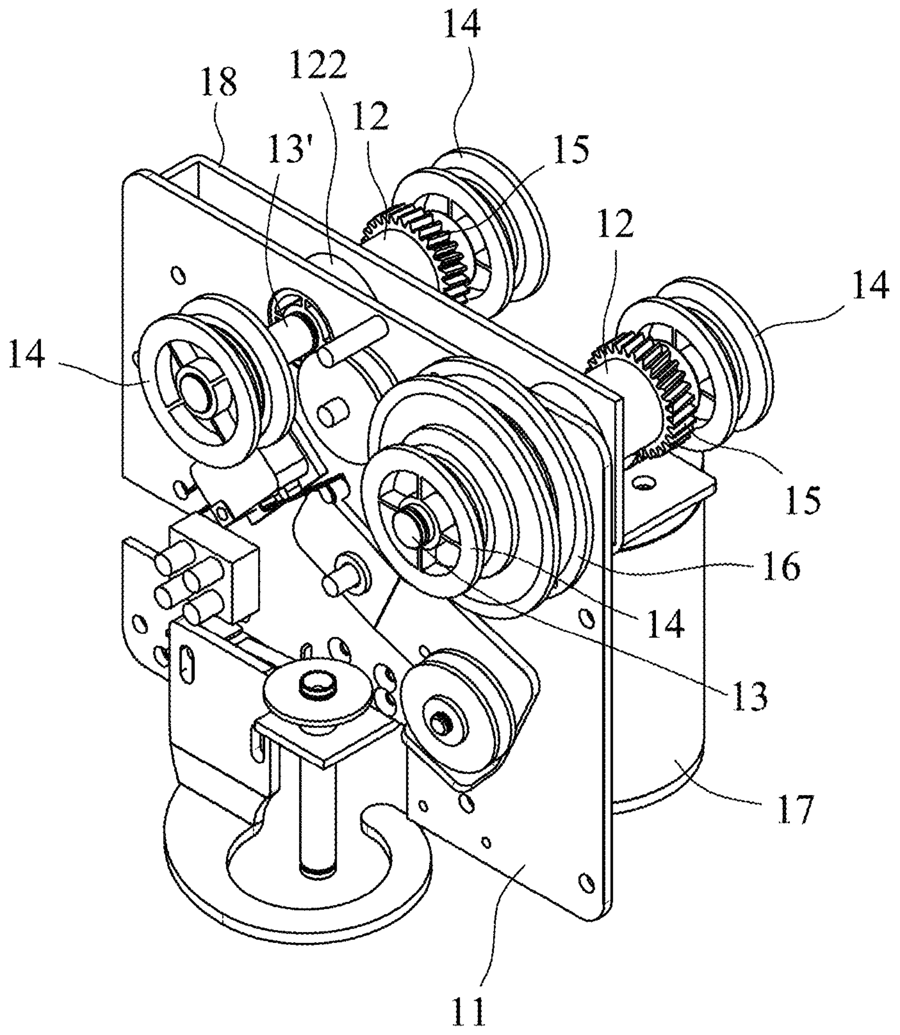
FIG. 1 PRIOR ART
FIG. 1 is a perspective view of a conventional claw machine crane.
Figure 2:
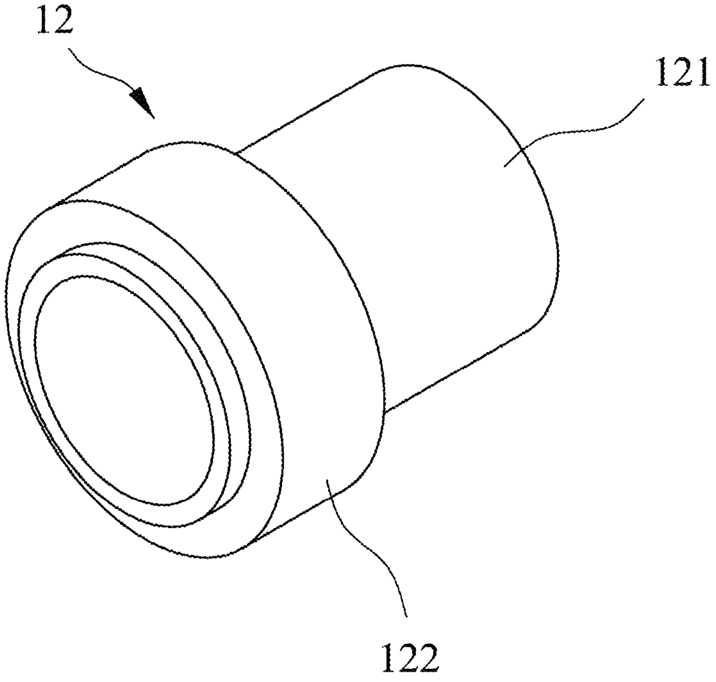
FIG. 2 PRIOR ART
FIG. 2 is a perspective view of a bushing of the conventional claw machine crane.
Figure 3:
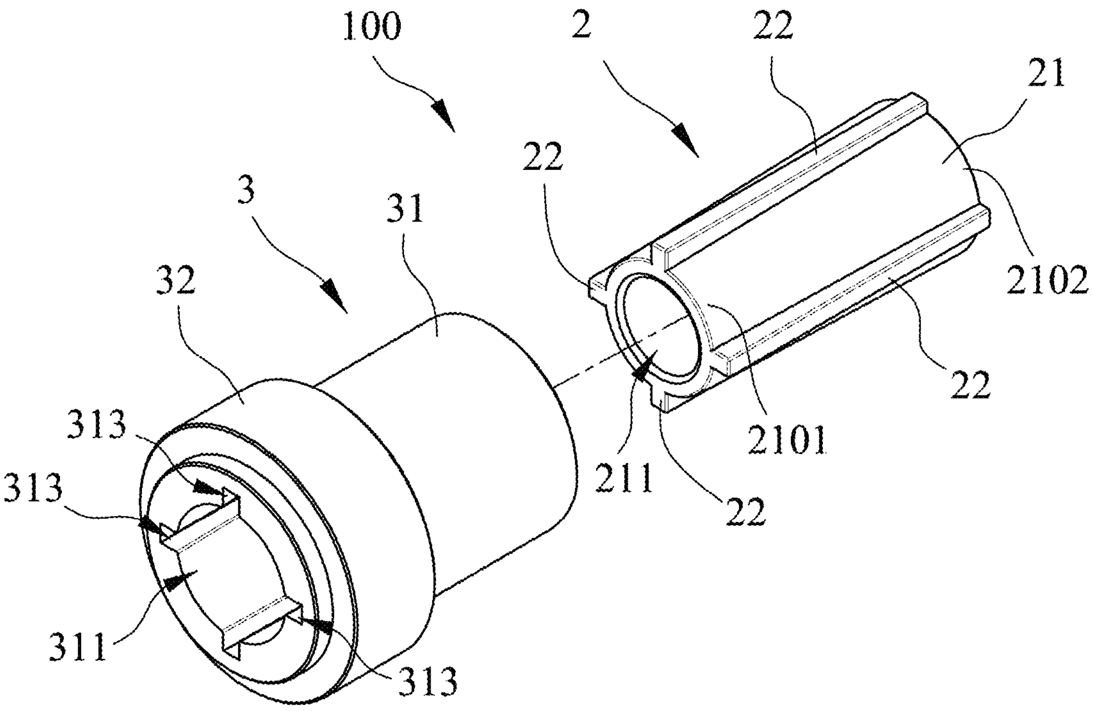
FIG. 3 is an exploded perspective view of a bushing according to an embodiment of the present disclosure.
Figure 4:
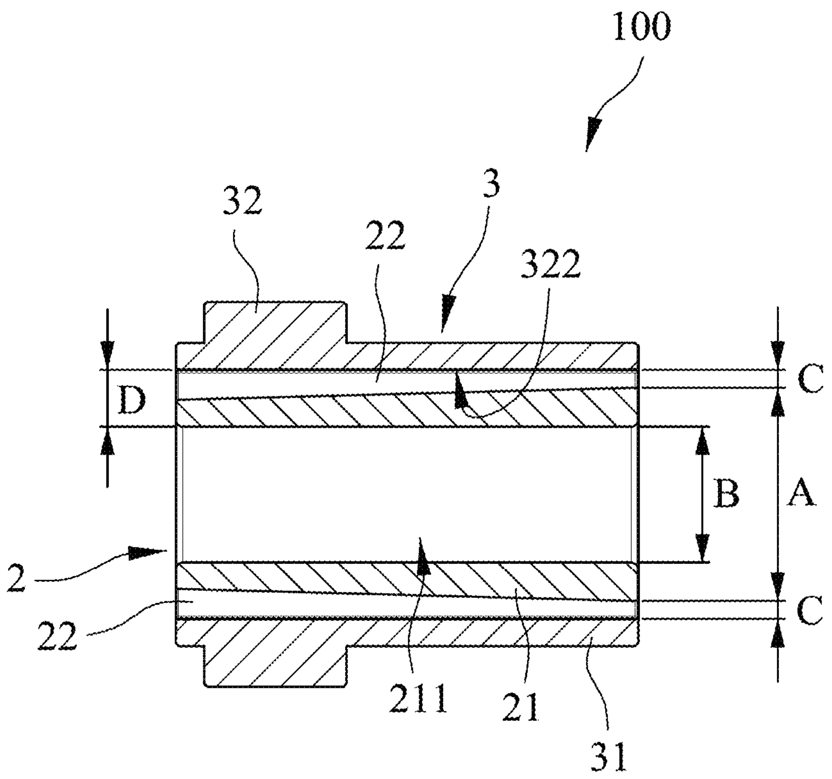
FIG. 4 is a partial sectional side view of the embodiment in an assembled state.

Referring to FIGS. 3 and 4, a bushing 100 according to an embodiment of the present disclosure is configured to be incorporated into a claw machine crane 4 (see FIGS. 5 and 6), and includes an inner sleeve 2, and a bushing body 3 for insertion of the inner sleeve 2 thereinto. The inner sleeve 2 is made of plastic, and defines an axis. The inner sleeve 2 includes a sleeve tube portion 21 defining a through hole 211 extending therethrough in an axial direction of the axis, and four equiangularly spaced-apart insertion ribs 22 projecting radially outward from an outer peripheral surface of the sleeve tube portion 21. The sleeve tube portion 21 has an outer diameter (A) gradually increasing from a first end 2101 to a second end 2102 thereof that is opposite to the first end 2101 in the axial direction, and an inner diameter (B) that is equal along a length thereof. In other words, the sleeve tube portion 21 has a generally truncated conical shape, but the through hole 211 thereof is a cylindrical hole with a same diameter along the length thereof.

Each insertion rib 22 has a thickness (C) in a radial direction gradually decreasing from the first end 2101 to the second end 2102 of the sleeve tube portion 21. Through this, each insertion rib 22 has a right-angled trapezoidal shape. A sum (D) of a thickness of the sleeve tube portion 21 in the radial direction and the thickness of a corresponding one of the insertion ribs 22 in the radial direction is equal in the axial direction. That is, one end of each insertion rib 22 having a larger thickness (C) corresponds to the first end 2101 of the sleeve tube portion 21 having a smaller outer diameter (A), and the other end of each insertion rib 22 having a smaller thickness (C) corresponds to the second end 2102 of the sleeve tube portion 21 having a larger outer diameter (A). For ease of distinction between the insertion ribs 22 and the sleeve tube portion 21 and for ease of explanation, the insertion ribs 22 are not shown in cross section in FIG. 4.

The bushing body 3 is made of metal, such as copper, and includes a bushing body tube portion 31 extending in the axial direction and defining an insertion hole 311 extending therethrough in the axial direction for insertion of the inner sleeve 2 thereinto, four equiangularly spaced-apart strip grooves 313 formed in a wall defining the insertion hole 311 for insertion of the insertion ribs 22 thereinto, respectively, and an annular flange 32 projecting radially outward from an outer peripheral surface of the bushing body tube portion 31 in proximity to one end thereof. Each strip groove 313 has two ends opposite in the axial direction that are open. The insertion hole 311 has a shape corresponding to that of the sleeve tube portion 21, that is, a truncated conical shape. Each strip groove 313 has a shape corresponding to that of each insertion rib 22, that is, a right-angled trapezoidal shape.

Figure 5:
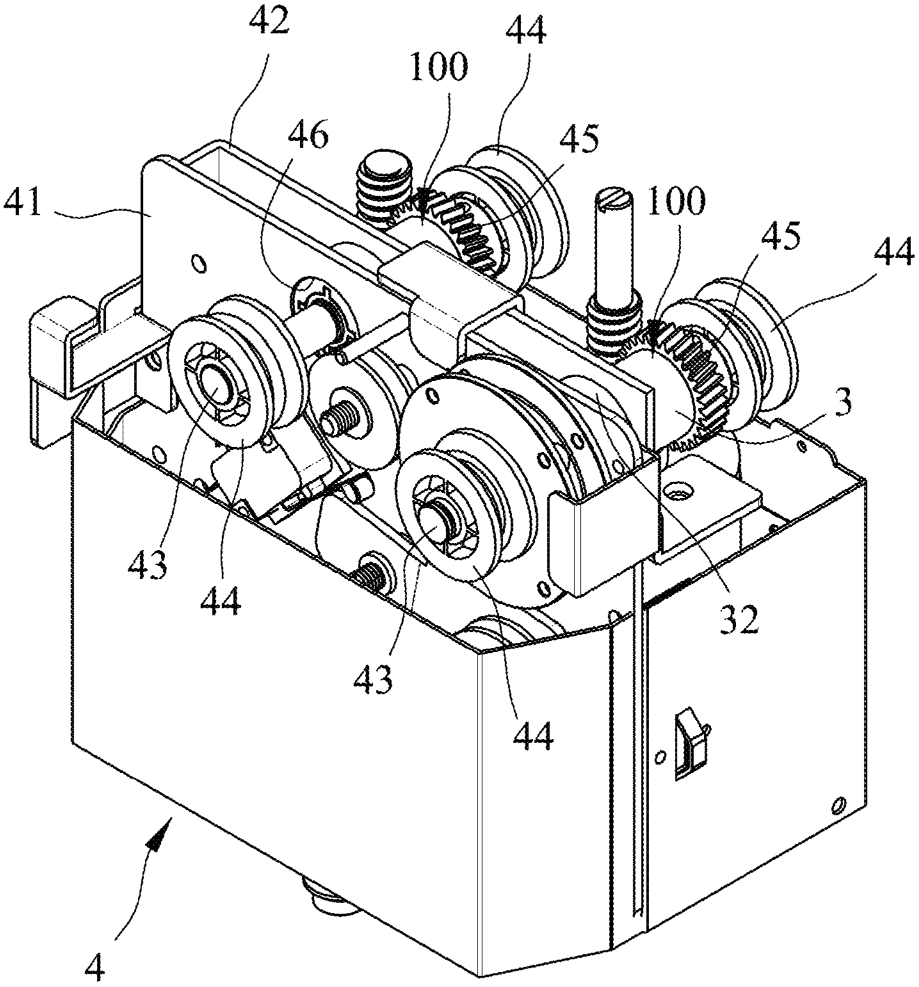
FIG. 5 is a perspective view of a claw machine crane incorporating two bushings of the embodiment.
Figure 6:
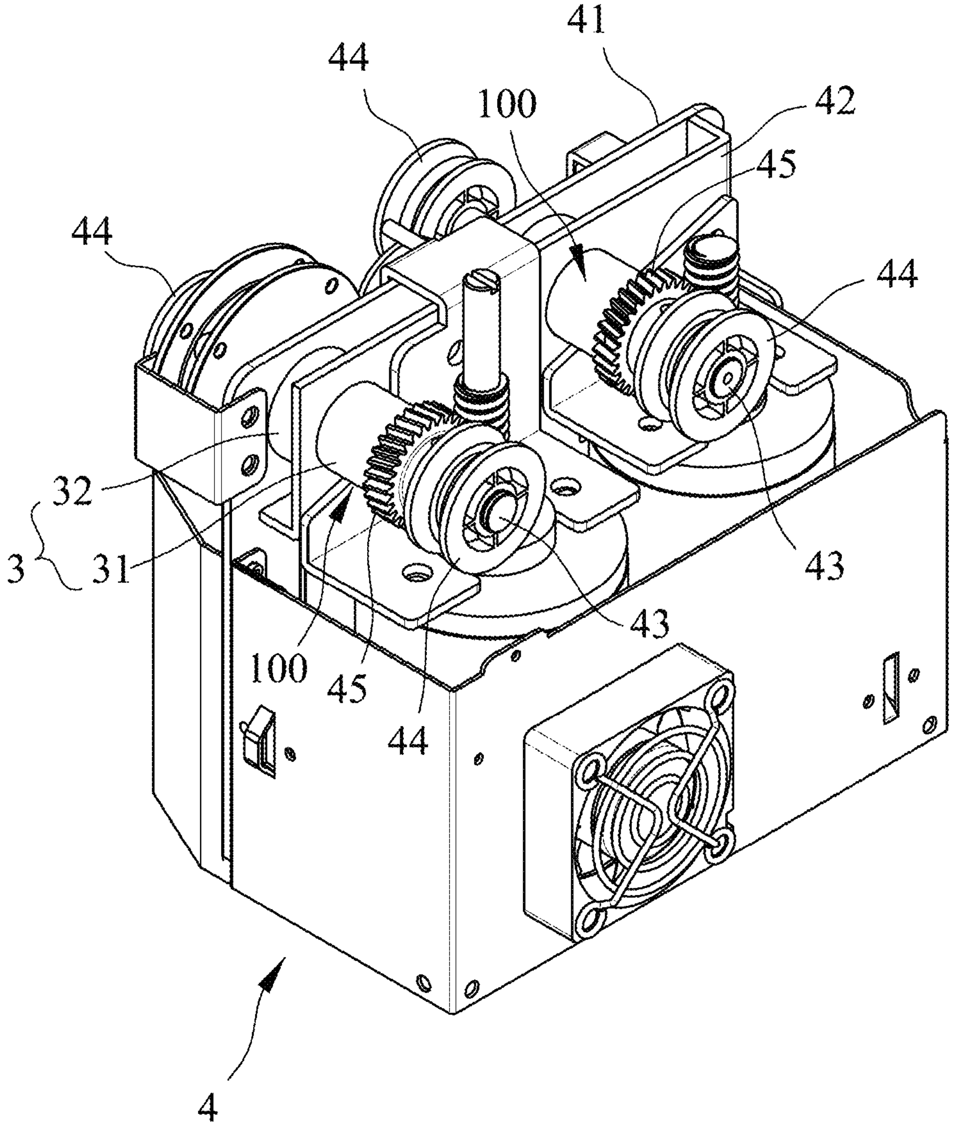
FIG. 6 is a view similar to FIG. 5, but taken from another angle.
Figure 7:
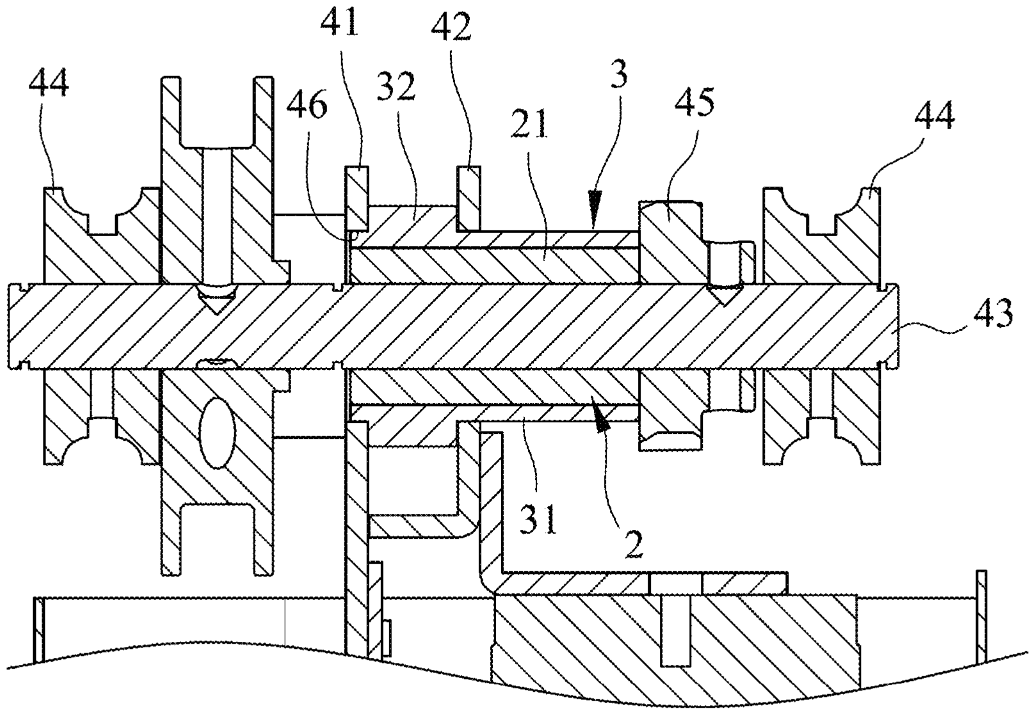
FIG. 7 is a fragmentary sectional side view of FIG. 5.

Referring to FIGS. 5 to 7, two bushings 100 of this embodiment are incorporated into the claw machine crane 4, and, since the connection relationship between each bushing 100 of this embodiment and the other components of the claw machine crane 4 is similar, only the connection relationship between one of the bushings 100 and the other components of the claw machine crane 4 will be described hereinbelow. The claw machine crane 4 includes a base plate 41, a positioning seat 42 spacedly fixed to the base plate 41, two transmission shafts 43 extending through the base plate 41 and the positioning seat 42, four wheel bodies 44 each two of which are disposed on two opposite ends of a corresponding one of the transmission shafts 43, and two transmission gears 45 respectively sleeved on the transmission shafts 43 and each adjacent to a corresponding one of the wheel bodies 44. The bushing 100 is sleeved on one of the transmission shafts 43 through the sleeve tube portion 21 of the inner sleeve 2 thereof, and extends through the positioning seat 42 to the base plate 41 through the bushing body 3 thereof such that one end of the bushing body tube portion 31 that is distal to the positioning seat 42 abuts against a corresponding one of the transmission gears 45, and the annular flange 32 is limited between the base plate 41 and the positioning seat 42.

Since the inner sleeve 2 is made of plastic, an inner surface of the sleeve tube portion 21 of the inner sleeve 2 that is in sliding contact with the transmission shaft 43 can be adhered with more lubricating oil, thereby achieving a better lubricating effect to reduce the frequency of stopping for oil replenishment or maintenance, and thereby improving the stability and smoothness of operation. The bushing body 3 is made of metal which can assist in heat dissipation of the inner sleeve 2 to withstand high-temperature operating environment. In addition, the insertion ribs 22 can act as reinforcing ribs to further enhance the structural strength of the bushing 100, so that the claw machine (not shown) can clamp a heavy object.

Referring back to FIGS. 3 to 5, on the other hand, because the inner sleeve 2 has a generally truncated conical shape, the first end 2101 thereof having a smaller outer diameter (A) can be easily inserted into the insertion hole 311 of the bushing body tube portion 31 so as to position the inner sleeve 2 thereat. At the same time, after the inner sleeve 2 is positioned, the inner sleeve 2 is limited by the bushing body 3 and cannot move further. This design is conducive to quick assembly, and has a foolproof effect. Furthermore, the base plate 41 has a through hole 46 for extension of the transmission shaft 43 therethrough. Although the through hole 46 has a diameter greater than a maximum outer diameter of the inner sleeve 2, through the abovementioned positioning design, it can be ensured that the inner sleeve 2 will not move away from the transmission gear 45 through the through hole 46 during operation, thereby preventing the first end 2101 of the inner sleeve 2 that is away from the transmission gear 45 from being displaced due to being unrestricted.

In summary, the inner sleeve 2 of the bushing 100 of this disclosure is made of plastic to facilitate the adhesion of the lubricating oil to the inner surface of the sleeve tube portion 21 thereof, thereby ensuring sufficient lubrication between the inner sleeve 2 and the transmission shaft 43. Furthermore, the bushing body 3 of the bushing 100 of this disclosure is made of metal, and cooperates with the insertion ribs 22, which can act as reinforcing ribs, to achieve the effect of reinforcing the structural strength of the bushing 100. In this way, the number of times of maintenance and replacement of the bushing 100 can be reduced, and the stability and smoothness of the operation can be improved. Moreover, because the inner sleeve 2 has a generally truncated conical shape, the first end 2101 thereof having a smaller outer diameter (A) can be easily inserted into the insertion hole 311 so as to position the inner sleeve 2 thereat. At the same time, after the inner sleeve 2 is positioned, the inner sleeve 2 is limited by the bushing body 3 and cannot move further, which is conducive to assembly and can prevent the inner sleeve 2 and the bushing body 3 from separating from each other. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A bushing for a claw machine crane, comprising:

an inner sleeve made of plastic and defining an axis, said inner sleeve including a sleeve tube portion defining a through hole extending therethrough in an axial direction of the axis, and a plurality of equiangularly spaced-apart insertion ribs projecting radially outward from an outer peripheral surface of said sleeve tube portion, said sleeve tube portion having an outer diameter that increases from a first end to a second end of said sleeve tube portion that is opposite to said first end in the axial direction, and an inner diameter that is constant along a length of said sleeve tube portion, each of said insertion ribs having a thickness in a radial direction that decreases from said first end to said second end of said sleeve tube portion, a sum of a thickness of said sleeve tube portion in the radial direction and the thickness of a corresponding one of said insertion ribs being constant in the axial direction; and a bushing body including a bushing body tube portion extending in the axial direction and defining an insertion hole extending therethrough in the axial direction for insertion of said inner sleeve thereinto, and an annular flange projecting radially outward from an outer peripheral surface of said bushing body tube portion in proximity to one end of said bushing body tube portion.

2. The bushing as claimed in claim 1, wherein said bushing body is made of metal.

3. The bushing as claimed in claim 1, wherein said bushing body further includes a plurality of equiangularly spaced-apart strip grooves formed in a wall defining said insertion hole for insertion of said insertion ribs thereinto, respectively, each of said strip grooves having two ends that are opposite in the axial direction and that are open.

4. The bushing as claimed in claim 3, wherein said insertion hole having a shape complementary to the shape of said sleeve tube portion, each of said insertion ribs having a right-angled trapezoidal shape when viewed along an axial cross section, each of said strip grooves having a shape complementary to the shape of each of said insertion ribs.

* * * * *